United States Patent
MacBain

(10) Patent No.: US 6,668,580 B2
(45) Date of Patent: Dec. 30, 2003

(54) CHILLER COMPRESSOR CIRCUIT CONTAINING TURNING VANES

(75) Inventor: Scott M. MacBain, Syracuse, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/123,705

(22) Filed: Apr. 16, 2002

(65) Prior Publication Data

US 2003/0192339 A1 Oct. 16, 2003

(51) Int. Cl.⁷ .................................................. F16L 55/00
(52) U.S. Cl. ........................................... 62/498; 138/37
(58) Field of Search ........................... 62/498, 192, 505; 137/13, 37, 39

(56) References Cited

U.S. PATENT DOCUMENTS

| | | | | | |
|---|---|---|---|---|---|
| 2,126,364 A | * | 8/1938 | Witzel | .......................... | 62/126 |
| 4,237,698 A | * | 12/1980 | Mount | .......................... | 62/197 |
| 4,824,614 A | * | 4/1989 | Jones | ........................... | 261/76 |
| 5,323,661 A | * | 6/1994 | Cheng | ......................... | 73/865.9 |
| 5,529,084 A | * | 6/1996 | Mutsakis et al. | .............. | 137/13 |
| 5,992,465 A | * | 11/1999 | Jansen | ........................... | 138/37 |

* cited by examiner

Primary Examiner—Melvin Jones

(57) ABSTRACT

Turning vanes are located in the suction and discharge line elbows of a refrigerant circuit and at the entrance to the condenser.

7 Claims, 3 Drawing Sheets

CHILLER COMPRESSOR CIRCUIT CONTAINING TURNING VANES

BACKGROUND OF THE INVENTION

In a central air conditioning system providing cooling, there are at least two fluid circuits. One circuit is the closed circuit in which the refrigerant is compressed, condensed and expanded. The second circuit is where conditioned air is supplied to the zone(s) and subsequently withdrawn to be re-cooled. A third fluid circuit would exist where chilled water is circulated to fan coil units to provide cooling to the air passing through/over the coils and the water is subsequently returned to the chiller of the air conditioning system to be re-cooled. The air conditioning system and fan coil units are very compact relative to the volumes for which they provide cooling.

Conditioned air is delivered by fans or blowers into ductwork and passes via terminals into zones/rooms. The conditioned air will typically be dehumidified when the system is in the cooling mode. The air supplied to a zone cannot be too cool or at too rapid a velocity as to cause drafts which would cause discomfort to the occupants of the zone. Accordingly, large volumes of air are required at relatively low velocities. As a specific example, cooling air is typically supplied at 55° F. for a zone made up of a manufacturing space with a cooling load of 300 tons (3,600,000 Btu/hr). Assuming that the conditioned air is warmed from 55° F. to 70° F. before being withdrawn, 220,000 standard cfm of air would have to be supplied to the zone. The ductwork to the most remote zone could extend for 400 feet and the velocity could be as much as 5000 ft./min. in the case of a manufacturing space with a high velocity air transmission system. This high velocity, however, is an extreme value and would be in the main line prior to branching with the additional total flow cross section, flow losses in the ducts, and the diffusing function of the terminals relative to the flow due to their increased flow cross section.

For a three hundred ton refrigeration system, the refrigerant charge would be on the order of 600 pounds. Due to an affinity between refrigerants and lubricants, some lubricant would be present in the refrigerant. In the closed circuit, gaseous refrigerant is drawn into the compressor where the refrigerant would be compressed to 131 psia and 120° F. and would flow at a rate of 360 cubic feet/minute into an six inch diameter path made up of two legs totaling four feet with a 90 ° elbow therebetween which define the discharge line. The hot, high pressure gas flows from the discharge line into the condenser. In the condenser the gaseous refrigerant condenses as it gives up heat due to heat transfer via a water cooled heat exchanger. The condensed refrigerant which is at 95° F. and 131 psia is discharged via a two inch line, eight feet in length. The condensed refrigerant then passes through an expansion device which requires the condensed refrigerant to pass through a restriction thereby undergoing a pressure drop and partially flashing as it passes into the evaporator/chiller. In the evaporator the remaining refrigerant evaporates due to heat transfer via a water cooled heat exchanger. The water gives up heat to the refrigerant and the cooled water is supplied to fan coil units where air passes over/through the coils and is cooled and supplied to the ductwork for delivery to the zones to provide cooling. The gaseous refrigerant in the evaporator is at 45° F. and 54 psia and is then supplied via the suction line which is eight inches in diameter with two legs totaling three feet with a 90° elbow therein. The flow through the suction line to the compressor completes the cycle.

In comparing the gaseous flows in the two circuits it will be noted that the supply and return air flows can each be on the order of one hundred feet in length with a number of turns and branches with a maximum flow cross section, for each branch, on the order of four square feet and a maximum supply velocity on the order of eighty three feet per second as an extreme value in the main line prior to branching, etc. For the gaseous refrigerant the discharge line is six inches in diameter and four feet in length with a 90° bend and the gas is at 131 psia, 120° F. and traveling at a velocity of 31 feet/sec. The suction line is eight inches in diameter and three feet in length with a 90° bend and the gas is at 45° F. and 54 psia and traveling at a velocity of 37.8 feet/sec. The suction and discharge flows are pulsed due to the compression process so the velocities are averages.

Due to long flow paths and the need to minimize pressure losses it is common to use turning vanes in air ductwork systems.

SUMMARY OF THE INVENTION

The gaseous refrigerant flow, although having a short flow path, must make at least one 90° turn which produces flow losses. The flow into a condenser of the shell and tube type is typically perpendicular to the tube direction and the tubes are simply supported. The refrigerant condenses on the outside of tubes carrying water which takes the heat out of the refrigerant gas. Therefore, it is common practice to place a plate between the discharge flow and the condenser tubes to prevent direct impingement of the discharge gas on the tubes which can cause the tubes to vibrate and fatigue. The present invention locates turning vanes in the elbows of the suction and discharge lines thereby reducing flow losses by reducing secondary flow losses by guiding the flow through the elbows. Additionally, turning vanes are located at the entrance to the condenser. These vanes are located at an otherwise straight flow into the protective plate at the entrance to the condenser and provide a back pressure to reduce the pressure drop in the discharge line. These turning vanes also act like terminals in distributing the flow relative to the heat exchanger structure in the condenser.

It is an object of this invention to minimize pressure drops in the fluid lines of a refrigerant circuit.

It is another object of this invention to increase chiller efficiency.

It is a further object of this invention to reduce the pressure drop in a compressor discharge. These objects, and others as will become apparent hereinafter, are accomplished by the present invention.

Basically, turning vanes are located in the suction and discharge line elbows of a refrigerant circuit and at the entrance to the condenser.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
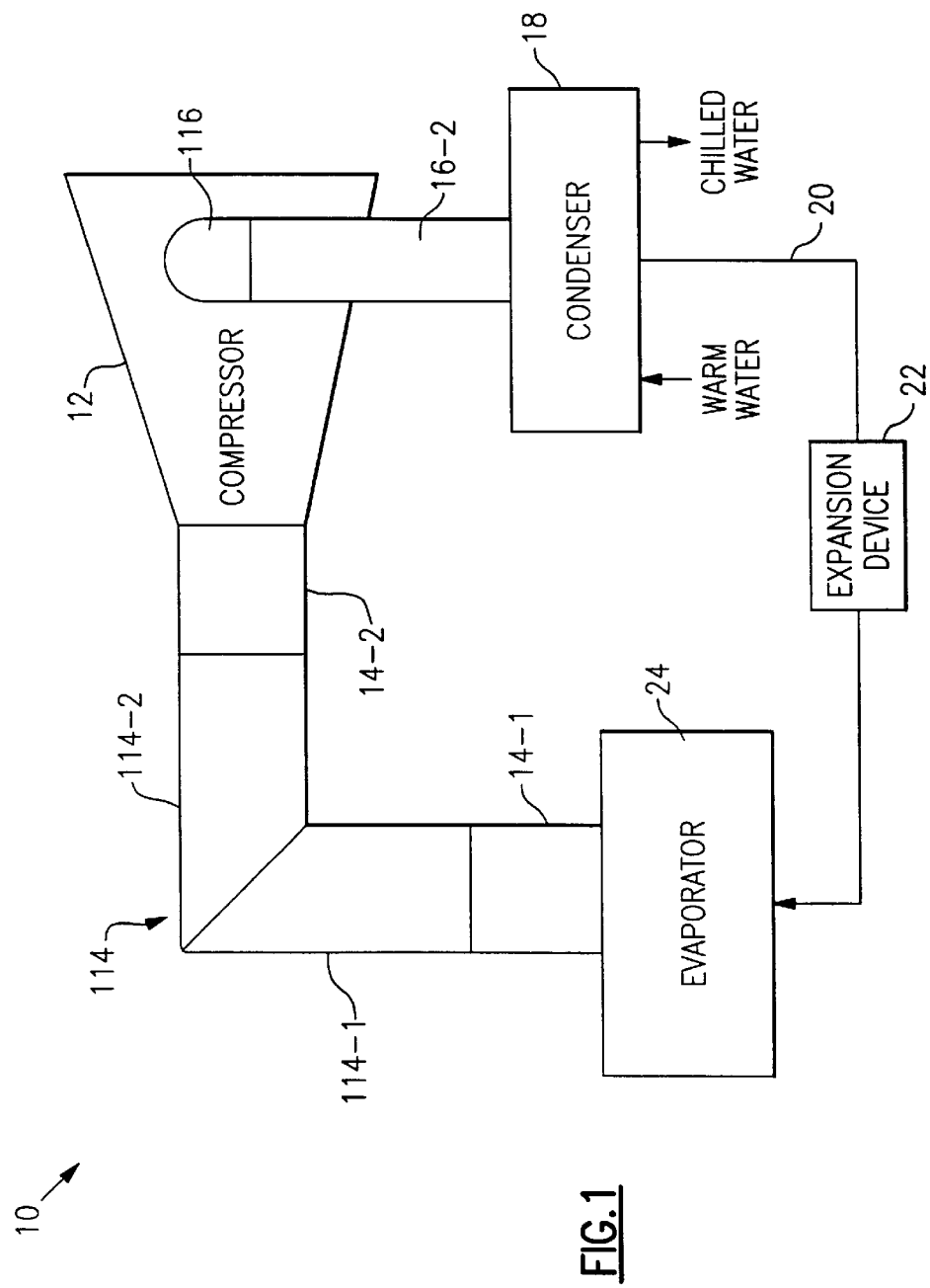
FIG. 1 is a schematic representation of a centrifugal chiller system employing the present invention.
Figure 2:
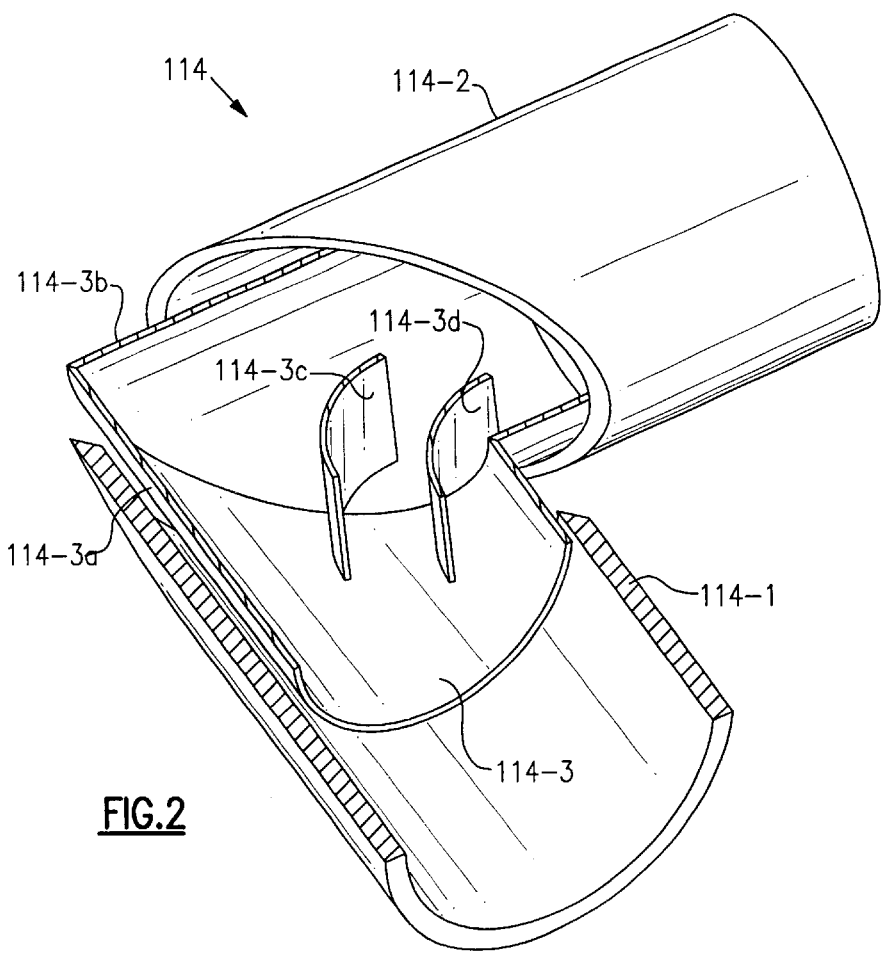
FIG. 2 is an exploded pictorial view of a partially cutaway portion of the vaned suction line elbow of the FIG. 1 system.

In FIG. 1, the numeral 10 generally designates a centrifugal chiller refrigeration or air conditioning system. Compressor 12 is a motor driven centrifugal compressor and, using the example given above, it is capable of delivering 300 tons (3,600,000 Btu/hr) of cooling. The suction line extends from evaporator 24 to compressor 12 and is made up of legs 14-1 and 14-2 totaling three feet in length of eight inch diameter pipe with 90° elbow 114 located therebetween. Elbow 114 is illustrated as a mitered elbow made up of legs 114-1 and 114-2 which may be legs 14-1 and 14-2, respectively. Referring specifically to FIG. 2, it will be noted that elbow 114 contains a mitered insert 114-3 having legs 114-3a and 114-3b which are snugly received in legs 114-1 and 114-2, respectively, with legs 114-3a and 114-3b being illustrated as only partially inserted into legs 114-1 and 114-2, respectively. When fully assembled, legs 114-1 and 114-2 will be suitably secured together, as by welding. Insert 114-3 includes a plurality of vanes with two vanes, 114-3c and 114-3d, being illustrated. Vanes 114-3c and 114-3d are welded or otherwise suitably secured in insert 114-3. While vanes 114-3c and 114-3d are illustrated as being of one thickness of metal or plastic, they may have an airfoil shape if necessary or desired. Vanes 114-3c and 114-3d are of the same length and are, nominally, arcs of circles and would be uniformly spaced where more than two vanes are present. The vanes 114-3c and 114-3d reduce turning flow losses thereby reducing compressor work and increasing system efficiency.

Figure 3:
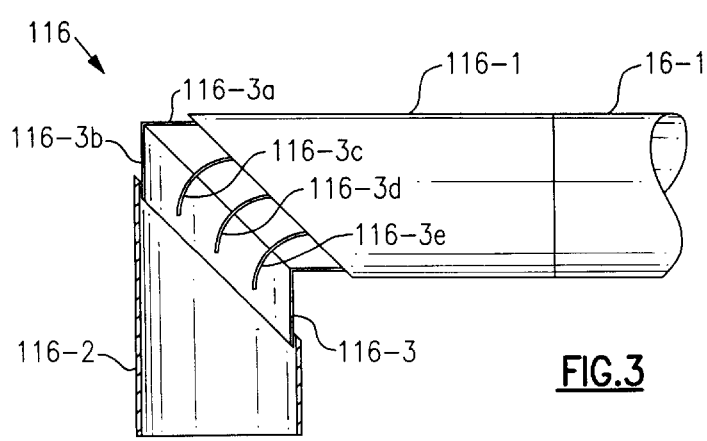
FIG. 3 is an exploded partially cutaway view of the vaned discharge line elbow of the FIG. 1 system.

Compressor 12 delivers hot, compressed refrigerant to the discharge line made up of legs 16-1 and 16-2 totaling four feet in length of six inch diameter pipe with 90° elbow 116 located therebetween. Elbow 116 is illustrated as a mitered elbow made up of legs 116-1 and 116-2 which may be legs 16-1 and 16-2, respectively. Referring specifically to FIG. 3, it will be noted that elbow 116 contains a mitered insert 116-3 having legs 116-3a and 116-3b which are snugly received in legs 116-1 and 116-2, respectively, with legs 116-3a and 116-3b being illustrated as only partially inserted into legs 116-1 and 116-2, respectively. When fully assembled, legs 116-1 and 116-2 will be suitably secured together, as by welding. Insert 116-3 includes a plurality of vanes with three vanes, 116-3c, 116-3d and 116-3e, being illustrated. Vanes 116-3c, 116-3d and 116-3e are welded or otherwise suitably secured in insert 116-3. While vanes 116-3c, 116-3d and 116-3e are illustrated as being of one thickness of metal or plastic, they may have an airfoil shape if necessary or desired. Vanes 116-3c, 116-3d and 116-3e are generally of the same length and are, nominally, arcs of circles and uniformly spaced. Vanes 116-3c, 116-3d and 116-3e reduce turning flow losses thereby reducing compressor work and increasing system efficiency. As illustrated, elbows 114 and 116 differ only in the number of vanes and either may be used in either the suction or discharge line when properly sized.

Figure 4:
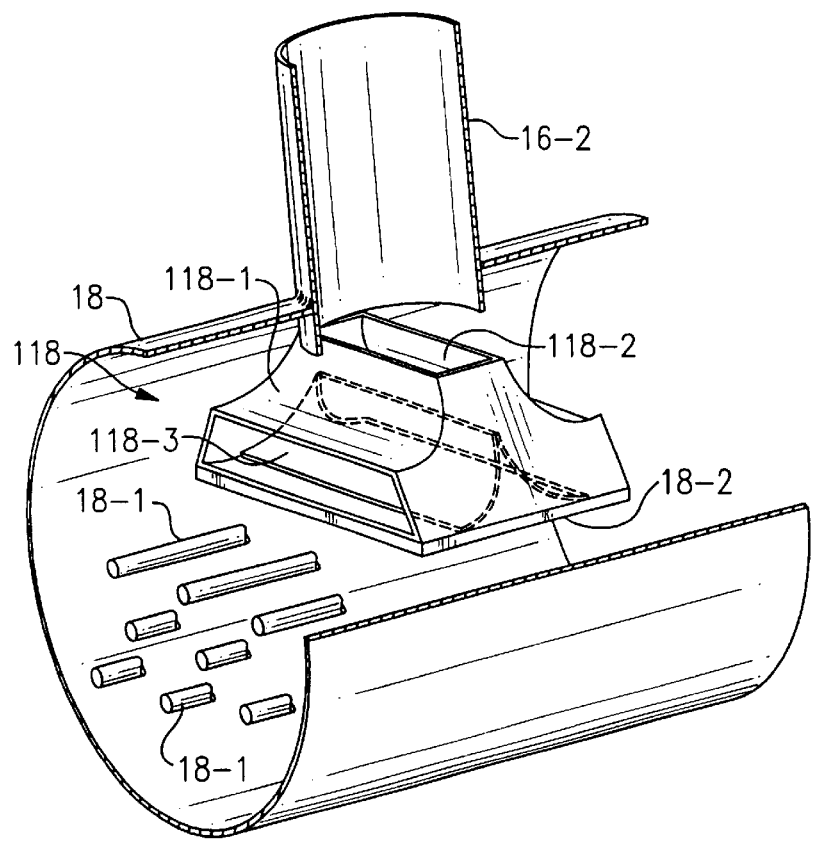
FIG. 4 is a pictorial view of a partially cutaway portion of the condenser showing the inlet structure of FIG. 1.
Figure 5:
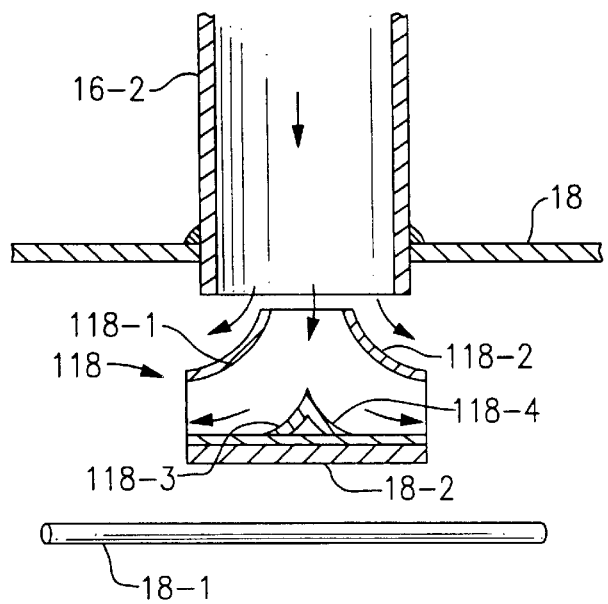
FIG. 5 is a sectional view of a portion of the structure illustrated in FIG. 4.

The flow through leg 16-1, elbow 116 and leg 16-2 into condenser 18 is at a pressure of 131 psia and a temperature of 120° F. with a volumetric flow of 360 cubic feet/minute with a velocity of 31 feet/sec. Referring specifically to FIGS. 4 and 5, condenser 18 has a plurality of tubes 18-1 running the length of condenser 18 and, typically, supported only at their ends which extend into water boxes. Water circulating through tubes 18-1 removes heat from the gaseous refrigerant which condenses and passes through line 20 and expansion device 22 before being supplied to evaporator 24. Conventionally, shell and tube condensers require a baffle plate 18-2 to prevent the high velocity discharges from compressor 12 from directly impinging upon the condenser tubes 18-1. If baffle plate 18-2 was absent in a conventional condenser, tube vibration and failure may result. A flat plate, however, is an inefficient means for redirecting the discharge flow. The present invention places a turning vane assembly 118 upstream of the baffle plate 18-2 so as to be supported thereby. Turning vane assembly 118 initially divides the flow entering condenser 18 via leg 16-2 into a plurality of flows. Two of the flows impinge upon the outer surfaces of vanes 118-1 and 118-2, respectively, of turning vane assembly 118 and are directed in opposite directions and generally parallel to the tubes 18-1. A third flow enters turning vane assembly 118 through the opening defined between the inlet ends of vanes 118-1 and 118-2 and impinges upon a portion of the turning vane assembly 118 defined by vanes 118-3 and 118-4 which is supported by baffle plate 18-2. The flow entering turning vane assembly 118 through the opening defined between the inlet ends of vanes 118-1 and 118-2 is divided into two flows. One flow passes between vanes 118-1 and 118-3 and is guided thereby and is directed in a direction generally parallel to that of the flow impinging upon the outer surface of vane 118-1 and generally parallel to the tubes 18-1. The second flow passes between vanes 118-2 and 118-4 and is guided thereby and is directed in a direction generally parallel to that of the flow impinging upon the outer surface of vane 118-2 and generally parallel to the tubes 18-1. Turning vane assembly 118 is illustrated with four vanes with vanes 18-1 and 18-2 coacting to direct a portion of the flow into condenser 18 along tubes 18-1 and towards respective ends of condenser 18 and directing a portion into impingement with vanes 118-3 and 118-4 which are supported by baffle plate 18-2. Vanes 118-3 and 118-4 divert the impinging flow along tubes 18-1 and towards respective ends of condenser 18. The turning vane assembly 118 reduces the turning flow losses which decreases the pressure drop of the refrigerant flow entering condenser 18. This decreases the work of the compressor and increases the overall system efficiency. Additionally, the flow distribution produced by the vane assembly 118 increases the heat transfer efficiency.

From the foregoing description it should be evident that the present invention teaches that turning vanes can be advantageously employed in conjunction with short branches of a closed refrigeration circuit. Three separate turning vane assemblies are disclosed and while the most efficient operation employs all three assemblies, they can be advantageously employed singly or in any combination.

Although preferred embodiments of the present invention have been illustrated and described, other changes will occur to those skilled in the art. For example, the elbows are disclosed as being mitered and with the vanes located in an insert which is snugly received in the legs, the vanes may be attached to the elbow and/or the elbow may be curved. It is therefore intended that the present invention is to be limited only by the scope of the appended claims.

What is claimed is:

1. A closed refrigeration system including a refrigerant path serially including a compressor, a discharge line, a condenser, an expansion device, an evaporator and a suction line leading back to said compressor with said fluid path having a plurality of portions defining changes in flow direction turning vanes are located in said condenser in at least one of said portions defining changes in flow direction and which guide the flow such that refrigerant flow is distributed as the refrigerant flow enters said condenser and is further distributed after entering said condenser.

2. The closed refrigeration system of claim 1 wherein said turning vanes located in said condenser divide the refrigerant flow into at least three flow paths.

3. In a closed refrigeration system including a refrigerant path serially including a compressor, a discharge line, a condenser, an expansion device, an evaporator and a suction line leading back to said compressor with said fluid path having a plurality of changes in flow direction the improvement including:
   turning vanes located in at least one of said plurality of changes in flow direction and which guide the flow; and
   turning vanes located in a second one of said plurality of changes in flow direction.

4. In a closed refrigeration system including a refrigerant path serially including a compressor, a discharge line, a condenser, an expansion device, an evaporator and a suction line leading back to said compressor with said fluid path having a plurality of changes in flow direction the improvement including turning vanes located in said condenser in at least one of said plurality of changes in flow direction and which guide the flow such that refrigerant flow is distributed as the refrigerant flow enters said condenser and is further distributed after entering said condenser.

5. The improvement of claim 4 wherein said turning vanes located in said condenser divide the refrigerant flow into at least three flow paths.

6. In a closed refrigeration system including a refrigerant path serially including a compressor, a discharge line, a condenser, an expansion device, an evaporator and a suction line leading back to said compressor with said fluid path having a plurality of changes in flow direction the improvement including:
   turning vanes located in at least one of said plurality of changes in flow direction and which guide the flow; and
   at least one of said plurality of changes in flow direction takes place in an elbow and said turning vanes are located in said elbow.

7. A closed refrigeration system including a refrigerant path serially including a compressor, a discharge line, a condenser, an expansion device, an evaporator and a suction line leading back to said compressor with said fluid path having a plurality of portions defining changes in flow direction:
   turning vanes are located in at least one of said portions defining changes in flow direction and which guide the flow; and
   turning vanes are located in a second one of said portions defining changes in flow direction.

* * * * *